United States Patent
Ryon et al.

(10) Patent No.: US 11,913,646 B2
(45) Date of Patent: Feb. 27, 2024

(54) FUEL INJECTOR SYSTEMS FOR TORCH IGNITERS

(71) Applicant: Delavan Inc., Des Moines, IA (US)

(72) Inventors: Jason Ryon, Carlisle, IA (US); Lev Alexander Prociw, Johnston, IA (US)

(73) Assignee: Delavan Inc., Des Moines, IA (US)

( * ) Notice: Subject to any disclaimer, the term of this patent is extended or adjusted under 35 U.S.C. 154(b) by 23 days.

(21) Appl. No.: 17/533,682

(22) Filed: Nov. 23, 2021

(65) Prior Publication Data
US 2022/0243916 A1    Aug. 4, 2022

Related U.S. Application Data

(63) Continuation of application No. 17/127,250, filed on Dec. 18, 2020, now Pat. No. 11,209,164.

(51) Int. Cl.
| | |
|---|---|
| *F23R 3/00* | (2006.01) |
| *F23R 3/28* | (2006.01) |
| *F02C 7/18* | (2006.01) |
| *F02C 7/232* | (2006.01) |

(52) U.S. Cl.
CPC ........... *F23R 3/283* (2013.01); *F02C 7/18* (2013.01); *F02C 7/232* (2013.01); *F05D 2220/32* (2013.01); *F05D 2240/35* (2013.01); *F05D 2260/232* (2013.01)

(58) Field of Classification Search
None
See application file for complete search history.

(56) References Cited

U.S. PATENT DOCUMENTS

| | | | |
|---|---|---|---|
| 2,540,642 | A | 2/1951 | Sidney et al. |
| 2,541,900 | A | 2/1951 | Williams |
| 2,645,082 | A | 7/1953 | Sarto |
| 2,648,951 | A | 8/1953 | McDougal |
| 2,734,341 | A | 2/1956 | Lovesey |

(Continued)

FOREIGN PATENT DOCUMENTS

| | | |
|---|---|---|
| DE | 1064760 B | 9/1959 |
| DE | 102018214281 B3 | 8/2019 |

(Continued)

OTHER PUBLICATIONS

Extended European Search Report for EP Application No. 21214883.7, dated May 13, 2022, pp. 10.

(Continued)

*Primary Examiner* — Edwin Kang
(74) *Attorney, Agent, or Firm* — Kinney & Lange, P.A.

(57) ABSTRACT

A fuel injector system for a torch igniter includes an injector body centered on an axis, a receiving aperture formed in a cap of the torch igniter, an injector aperture, an air channel, a fuel channel, and a purge passage formed in a housing of the torch igniter and fluidly connected to a cooling air source. The injector body includes an axial wall at a first axial end of the injector body, an outer wall connected to the axial wall and extending along the axis transverse to the first wall, and an inner portion connected to the axial wall and extending along the axis transverse to the axial wall. An outer surface of the inner portion is spaced a distance from an inner surface of the outer wall, forming an insulating space between the outer wall and the inner portion.

16 Claims, 5 Drawing Sheets

(56) References Cited

U.S. PATENT DOCUMENTS

| | | | |
|---|---|---|---|
| 2,784,553 A | 3/1957 | De et al. |
| 2,811,676 A | 10/1957 | Beye |
| 2,840,742 A | 6/1958 | Watters |
| 2,847,826 A | 8/1958 | Dennis |
| 2,864,234 A | 12/1958 | Seglem et al. |
| 2,885,859 A | 5/1959 | Fortunato |
| 2,958,196 A | 11/1960 | Wie et al. |
| 2,967,224 A | 1/1961 | Irwin |
| 3,009,321 A | 11/1961 | Jones et al. |
| 3,487,636 A | 1/1970 | Vdoviak et al. |
| 3,558,251 A | 1/1971 | Bauger et al. |
| 3,690,093 A | 9/1972 | Carlisle |
| 3,898,797 A | 8/1975 | Wood |
| 3,954,389 A | 5/1976 | Szetela |
| 3,990,834 A | 11/1976 | Dubell et al. |
| 4,012,904 A | 3/1977 | Nogle |
| 4,099,373 A | 7/1978 | Griffin et al. |
| 4,112,675 A | 9/1978 | Pillsbury et al. |
| 4,141,213 A * | 2/1979 | Ross ............ F02C 7/264 60/737 |
| 4,192,139 A | 3/1980 | Buchheim |
| 4,194,358 A | 3/1980 | Stenger |
| 4,351,156 A | 9/1982 | White et al. |
| 4,412,414 A | 11/1983 | Novick et al. |
| 4,441,323 A | 4/1984 | Colley |
| 4,828,488 A | 5/1989 | Reiser et al. |
| 4,860,533 A | 8/1989 | Joshi |
| 4,912,931 A | 4/1990 | Joshi et al. |
| 4,915,615 A | 4/1990 | Kawamura et al. |
| 5,085,040 A | 2/1992 | Tilston |
| 5,390,855 A | 2/1995 | Mims et al. |
| 5,469,700 A | 11/1995 | Corbett et al. |
| 5,499,497 A | 3/1996 | Defreitas |
| 5,636,511 A | 6/1997 | Pfefferle et al. |
| 5,640,841 A | 6/1997 | Crosby |
| 5,673,554 A | 10/1997 | Defreitas et al. |
| 5,695,328 A | 12/1997 | Defreitas et al. |
| 5,720,163 A | 2/1998 | Pfefferle et al. |
| 5,744,206 A | 4/1998 | Russek et al. |
| 5,845,480 A | 12/1998 | Defreitas et al. |
| 6,138,654 A | 10/2000 | Pretorius et al. |
| 6,195,247 B1 | 2/2001 | Cote et al. |
| 6,240,731 B1 | 6/2001 | Hoke et al. |
| 6,247,300 B1 | 6/2001 | Muramatsu et al. |
| 6,483,022 B1 | 11/2002 | Packard |
| 6,884,967 B1 | 4/2005 | Leigh |
| 6,915,638 B2 | 7/2005 | Runkle et al. |
| 6,952,927 B2 | 10/2005 | Howell et al. |
| 6,968,699 B2 | 11/2005 | Howell et al. |
| 7,124,724 B2 | 10/2006 | Fleetwood |
| 7,137,255 B2 | 11/2006 | Schmotolocha et al. |
| 7,216,488 B2 | 5/2007 | Howell et al. |
| 7,470,875 B1 | 12/2008 | Wilcox et al. |
| 7,481,248 B2 | 1/2009 | Prociw et al. |
| 7,637,094 B2 | 12/2009 | Costello et al. |
| 8,365,710 B2 | 2/2013 | Lykowski et al. |
| 8,713,944 B2 | 5/2014 | Bleeker |
| 9,080,772 B2 | 7/2015 | Prociw et al. |
| 9,135,755 B2 | 9/2015 | Youssef |
| 9,279,398 B2 | 3/2016 | Mcalister |
| 9,413,141 B2 | 8/2016 | Leglaye et al. |
| 9,453,491 B2 | 9/2016 | Tanaka et al. |
| 9,476,399 B1 | 10/2016 | Munson |
| 9,567,912 B2 | 2/2017 | Prociw et al. |
| 10,041,859 B2 | 8/2018 | Desilva et al. |
| 10,156,189 B2 | 12/2018 | Sze et al. |
| 10,488,047 B2 | 11/2019 | Ott et al. |
| 10,584,639 B2 | 3/2020 | Dam et al. |
| 10,711,699 B2 | 7/2020 | Dam et al. |
| 10,823,398 B2 | 11/2020 | Choudhri et al. |
| 11,209,164 B1* | 12/2021 | Ryon ............ F23R 3/343 |
| 11,226,103 B1 | 1/2022 | Ryon et al. |
| 11,255,535 B1 | 2/2022 | Eckert et al. |
| 2002/0050061 A1 | 5/2002 | Komyoji et al. |
| 2002/0162333 A1 | 11/2002 | Zelina |
| 2004/0050061 A1 | 3/2004 | Schmotolocha et al. |
| 2004/0168442 A1 | 9/2004 | Schmotolocha et al. |
| 2005/0053876 A1 | 3/2005 | Joos et al. |
| 2005/0166595 A1 | 8/2005 | Fletcher et al. |
| 2005/0284442 A1 | 12/2005 | Stuttaford et al. |
| 2006/0054233 A1 | 3/2006 | Prociw et al. |
| 2006/0168967 A1 | 8/2006 | Simons et al. |
| 2008/0036209 A1 | 2/2008 | Bulkovitch |
| 2008/0141651 A1 | 6/2008 | Eason et al. |
| 2008/0299504 A1 | 12/2008 | Horn |
| 2009/0234555 A1 | 9/2009 | Williams et al. |
| 2009/0314000 A1 | 12/2009 | Evulet et al. |
| 2010/0043444 A1* | 2/2010 | Gross ............ F23R 3/00 60/789 |
| 2010/0071343 A1 | 3/2010 | Yu |
| 2010/0126617 A1 | 5/2010 | Stroempl et al. |
| 2011/0088409 A1 | 4/2011 | Carlisle |
| 2011/0113787 A1 | 5/2011 | Milosavljevic |
| 2011/0247341 A1 | 10/2011 | McMahan et al. |
| 2011/0247590 A1 | 10/2011 | Donovan |
| 2011/0271684 A1 | 11/2011 | Corsmeier et al. |
| 2012/0085468 A1 | 4/2012 | Walker |
| 2012/0125008 A1 | 5/2012 | Prociw et al. |
| 2013/0000323 A1 | 1/2013 | Kupratis |
| 2013/0040255 A1 | 2/2013 | Shi et al. |
| 2013/0143171 A1 | 6/2013 | Soda et al. |
| 2013/0174562 A1 | 7/2013 | Holcomb et al. |
| 2013/0283800 A1 | 10/2013 | Romig et al. |
| 2014/0060063 A1 | 3/2014 | Boardman et al. |
| 2014/0150401 A1 | 6/2014 | Venter |
| 2014/0215997 A1 | 8/2014 | Lior et al. |
| 2014/0216384 A1 | 8/2014 | Tanaka et al. |
| 2014/0260304 A1 | 9/2014 | Cummings et al. |
| 2014/0290259 A1* | 10/2014 | Plante ............ F02C 7/264 60/39.35 |
| 2014/0314548 A1 | 10/2014 | Rivers et al. |
| 2014/0366505 A1* | 12/2014 | Prociw ............ F02C 7/266 60/39.821 |
| 2014/0366542 A1 | 12/2014 | Teets |
| 2014/0366551 A1 | 12/2014 | Prociw et al. |
| 2015/0036781 A1 | 2/2015 | Youssef |
| 2015/0040575 A1 | 2/2015 | Martinez Fabre et al. |
| 2015/0260406 A1* | 9/2015 | Carrere ............ F02C 3/14 60/787 |
| 2015/0275755 A1 | 10/2015 | Ogata et al. |
| 2015/0275769 A1 | 10/2015 | Foutch et al. |
| 2015/0308351 A1 | 10/2015 | Sheridan |
| 2015/0345426 A1 | 12/2015 | Houston et al. |
| 2015/0345788 A1 | 12/2015 | Miyata et al. |
| 2015/0354517 A1 | 12/2015 | Mansour et al. |
| 2016/0003150 A1 | 1/2016 | Dicintio et al. |
| 2016/0010559 A1 | 1/2016 | Hoke et al. |
| 2016/0047318 A1 | 2/2016 | Dam et al. |
| 2016/0084169 A1 | 3/2016 | Stuttaford et al. |
| 2016/0169110 A1 | 6/2016 | Myers et al. |
| 2016/0230993 A1 | 8/2016 | Dai et al. |
| 2017/0082022 A1 | 3/2017 | Lee |
| 2017/0138266 A1 | 5/2017 | Caples |
| 2017/0145852 A1 | 5/2017 | McCune et al. |
| 2017/0284298 A1 | 10/2017 | Suciu et al. |
| 2017/0298822 A1 | 10/2017 | Garde La Casa |
| 2017/0350590 A1* | 12/2017 | Choudhri ............ F23D 14/02 |
| 2017/0356656 A1 | 12/2017 | Ogata et al. |
| 2018/0003388 A1 | 1/2018 | Park |
| 2018/0010795 A1 | 1/2018 | Nath et al. |
| 2018/0051710 A1 | 2/2018 | Takamura et al. |
| 2018/0058224 A1 | 3/2018 | Jennings et al. |
| 2018/0058331 A1 | 3/2018 | Barton et al. |
| 2018/0058404 A1 | 3/2018 | Tibbs |
| 2018/0100437 A1 | 4/2018 | Dicintio et al. |
| 2018/0134407 A1 | 5/2018 | Elbibary et al. |
| 2018/0154446 A1 | 6/2018 | Brown et al. |
| 2018/0170575 A1 | 6/2018 | Ziarno |
| 2018/0172271 A1 | 6/2018 | Moniz et al. |
| 2018/0179896 A1 | 6/2018 | Pal et al. |
| 2018/0179956 A1 | 6/2018 | Wertz |
| 2018/0283692 A1 | 10/2018 | Ryon et al. |
| 2018/0356095 A1 | 12/2018 | Patel et al. |
| 2018/0363555 A1 | 12/2018 | Zelina et al. |

(56) References Cited

U.S. PATENT DOCUMENTS

| | | |
|---|---|---|
| 2019/0010872 A1 | 1/2019 | Dam et al. |
| 2019/0024897 A1 | 1/2019 | Prociw et al. |
| 2019/0032561 A1 | 1/2019 | Stoia et al. |
| 2019/0178497 A1 | 6/2019 | Jones et al. |
| 2019/0249877 A1 | 8/2019 | Fryer |
| 2020/0080530 A1 | 3/2020 | Freer et al. |
| 2020/0088409 A1 | 3/2020 | Greenfield et al. |
| 2020/0191059 A1 | 6/2020 | Ryon et al. |
| 2020/0309378 A1 | 10/2020 | Dam et al. |
| 2020/0348024 A1 | 11/2020 | Hicks |
| 2021/0215100 A1 | 7/2021 | Head et al. |
| 2022/0007488 A1 | 1/2022 | Bai et al. |

FOREIGN PATENT DOCUMENTS

| | | |
|---|---|---|
| EP | 2189720 A1 | 5/2010 |
| EP | 3128166 A1 | 2/2017 |
| EP | 2677240 B1 | 4/2020 |
| FR | 970988 A | 1/1951 |
| FR | 1218296 A | 5/1960 |
| GB | 693846 A | 7/1953 |
| GB | 791990 A | 3/1958 |
| GB | 819141 A | 8/1959 |
| GB | 859184 A | 1/1961 |
| JP | 2015021715 A | 2/2015 |
| KR | 101279722 B1 | 6/2013 |

OTHER PUBLICATIONS

Extended European Search Report for EP Application No. 21216163.2, dated May 16, 2022, 8 pages.
Extended European Search Report for EP Application No. 21209057.5, dated Jul. 19, 2022, 8 pages.
Extended European Search Report for EP Application No. 21205393.8, dated Mar. 17, 2022, 8 pages.
Extended European Search Report for EP Application No. 21212869.8, dated Apr. 28, 2022, pp. 7.
Extended European Search Report for EP Application No. 21213899.4, dated May 6, 2022, 8 pages.
Extended European Search Report for EP Application No. 21214511.4, dated Apr. 29, 2022, 8 pages.
Extended European Search Report for EP Application No. 21214798.7, dated May 11, 2022, 8 pages.
Extended European Search Report for EP Application No. 21214894.4, dated May 3, 2022, 9 pages.
Extended European Search Report for EP Application No. 21201782.6, dated Mar. 28, 2022, 10 pages.
Extended European Search Report for EP Application No. 21205035.5, dated Mar. 28, 2022, 9 pages.
Extended European Search Report for EP Application No. 21214138.6, dated Apr. 25, 2022, 7 pages.
"Metal Seal Design Guide—High Performance Engineered Seals and Sealing Systems", from Parker Hannifin Corporation Composite Sealing Systems Division, 2016, 106 pages.
Database WPI—2017 Clarivate Analytics, Week 201919, Thomson Scientific, London GB; AN 2019-17673X XP002806356, 2 pages.
Extended European Search Report for EP Application No. 21215655.8, dated May 2, 2022, 8 pages.
Extended European Search Report for EP Application No. 21215709.3, dated May 12, 2022, 9 pages.
Extended European Search Report for EP Application No. 21192156.4, dated Feb. 1, 2022, 7 pages.

\* cited by examiner

FUEL INJECTOR SYSTEMS FOR TORCH IGNITERS

CROSS-REFERENCE TO RELATED APPLICATION(S)

This application is a continuation of U.S. application Ser. No. 17/127,250 filed Dec. 18, 2020 for "FUEL INJECTOR SYSTEMS FOR TORCH IGNITERS" by J. Ryon and L. A. Prociw.

BACKGROUND

The present disclosure relates to gas turbine engines and, more particularly, to cooling arrangements suitable for torch igniters used in the combustor section of a gas turbine engine.

Torch igniters can be used in lieu of spark igniters to provide an ignition source for combustors located in gas turbine engines. Torch igniters provide a flame as an ignition source for a combustor rather than the electric current provided by spark igniters. Consequently, torch igniters can provide a larger target for fuel injectors used in a combustor, permitting the use of a greater range of fuel injector designs. Torch igniters are often designed to operate on low fuel flow rates to reduce the amount of fuel consumed by a torch igniter.

SUMMARY

In one embodiment, a fuel injector system for a torch igniter includes an injector body centered on an axis, a receiving aperture formed in a cap of the torch igniter, an injector aperture, an air channel, a fuel channel, and a purge passage formed in a housing of the torch igniter and fluidly connected to a cooling air source. The injector body includes an axial wall at a first axial end of the injector body, an outer wall connected to the axial wall and extending along the axis transverse to the first wall, and an inner portion connected to the axial wall and extending along the axis transverse to the axial wall. An outer surface of the inner portion is spaced a distance from an inner surface of the outer wall, forming an insulating space between the outer wall and the inner portion. The receiving aperture receives the inner portion of the injector body at a second axial end of the injector body, wherein the second axial end is opposite the first axial end. The injector aperture is formed within the inner portion of the injector body and is directly fluidly connected to an interior volume of the torch igniter. The air inlet is configured to intake a flow of air at the axial wall and the fuel inlet is configured to intake a flow of fuel at the axial wall. The air channel is disposed within the inner portion, is configured to channel air from the air inlet to the injector aperture, and is centered on and extends along the axis. The fuel channel is disposed within the inner portion, is configured to channel fuel from the fuel inlet to the injector aperture, and is centered on the axis and extends helically about the air channel along the axis. The purge passage is configured to impinge cooling air from the cooling air source onto an exterior surface of the outer wall near the receiving aperture.

In another embodiment, a torch igniter for use in the combustor section of a gas turbine engine includes a combustion chamber oriented about an axis, a cap defining an axially upstream end of the combustion chamber and oriented about the axis, a tip defining an axially downstream end of the combustion chamber, a housing extending from the cap to the tip and defining a radial extent of the combustion chamber, an outlet passage defined by the housing within the tip, a glow plug capable of being resistively heated, a cooling channel formed in the housing, and a fuel injector system according to another embodiment of this invention. The combustion chamber has axially upstream and downstream ends defining a flow direction through the combustion chamber along the axis, the outlet passage is fluidly connected to the combustion chamber, an innermost end of the glow plug extends through the cap into the combustion chamber, and the cooling channel is configured to cool the housing. The fuel injector system is received in the cap.

The present summary is provided only by way of example, and not limitation. Other aspects of the present disclosure will be appreciated in view of the entirety of the present disclosure, including the entire text, claims, and accompanying figures.

Figure 1:
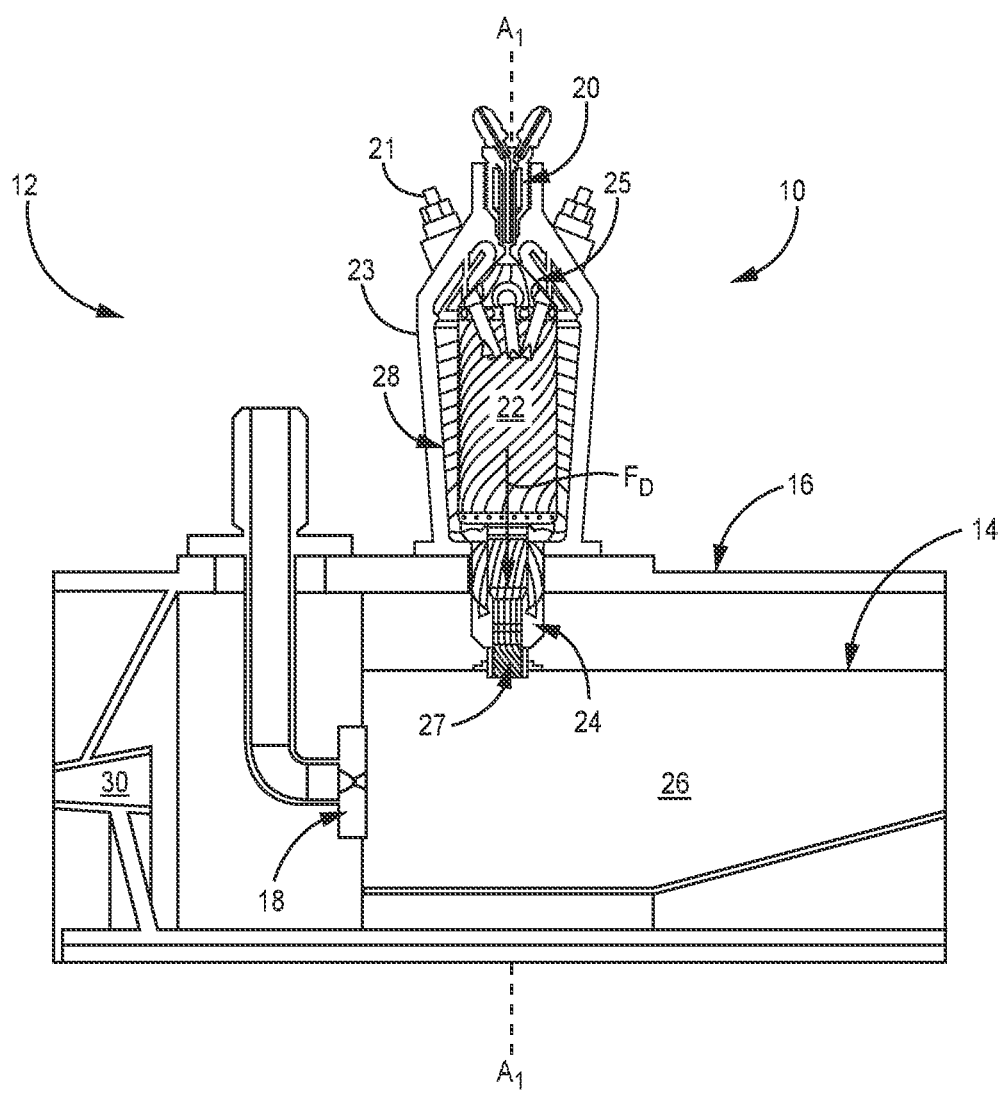
FIG. 1 is a cross-sectional view of an example of a torch igniter in a combustion section of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention includes structures and methods for fuel injector systems for use with torch igniters used within the combustor section of a gas turbine engine. These structures and methods allow for the use of low flow rates of liquid fuels without overheating and degrading the fuel. These structures and methods also provide for purge systems that prevent reverse fuel flow through the fuel injector systems disclosed herein. The structures disclosed herein can advantageously be formed from high-temperature metallic components readily fabricable via additive manufacturing.

FIG. 1 is a cross-sectional view of torch igniter 10 disposed within combustion section 12 of a gas turbine engine. In the illustrated embodiment, torch igniter 10 is mounted to combustor liner 14 and extends along axis $A_1$-$A_1$ through high-pressure case 16. In operation, a fuel injector 20 injects fuel that impinges on surface igniter 21 and creates combustion gases within torch combustion chamber 22. Housing 23 surrounds and defines combustion chamber 22. Housing 23 is made of any suitable material to contain high-temperature combustion gases and in some examples is made of a metal material readily fabricable by additive manufacturing. Alternatively, housing 23 can be fabricated by subtractive manufacturing or a combination of additive and subtractive manufacturing. Housing 23 also includes tip section 24 and cap section 25, which are disposed at the axially downstream and upstream ends of combustion chamber 22, respectively. Combustion gases travel through torch combustion chamber 22 in direction $F_d$ and enter an interior volume of combustor 26 through outlet passage 27, which is defined by housing 23 in tip section 24. Combustion gases entering combustor 26 are capable of igniting the fuel mixture from fuel nozzle 18 and thereby initiating combustion within combustor 26. Torch igniter 10 intakes air to be used for combustion within torch combustion chamber 22 from within high-pressure case 16 or from another source of compressed air elsewhere in the gas turbine engine, such as an auxiliary air compressor. High-pressure air is provided to high-pressure case 16 through diffuser 30.

The high-pressure air used for combustion can be channeled through cooling channels 28 to cool the inner surface of housing 23, which functions as a liner along the inner surface of housing 23 and is exposed to the hot combustion gases in combustion chamber 22. The inner surface of housing 23 is shown transparent in FIG. 1 to illustrate the helical structure of cooling channels 28. This also allows for regenerative heating of the high-pressure air used for combustion, improving combustion efficiency of fuel in combustion chamber 22.

In the example depicted in FIG. 1, surface igniters 21 are rod-shaped glow plugs mounted through housing 23. The innermost end of each surface igniter 21 extends through housing 23. Surface igniters 21 can be any type of igniter suitable for igniting fuel in torch combustion chamber 22, such as glow plugs or spark igniters. In the illustrated embodiment surface igniters 21 are depicted as glow plugs, which are resistively heated to ignite fuel in combustion chamber 22. Where surface igniters 21 are glow plugs, they can be resistively heated by electric current supplied by a power source and are formed of a material capable of being non-destructively resistively heated. The material can be a ceramic material, such as silicon nitride.

Fuel injector 20 is generally configured to inject gaseous fuel or a liquid fuel/air mixture. The gaseous fuel can be, for example, natural gas, hydrogen, ammonia, liquid hydrogen, syngas, or a blend of any of the aforementioned fuels. The liquid fuel can be, for example, conventional diesel, biodiesel, kerosene, naphtha, or a blend of any of the aforementioned fuels. A controller, such as an engine control unit (ECU) of a full authority digital engine control (FADEC) or another appropriate gas turbine controller, can be used to selectively flow gaseous fuel or liquid fuel and air to fuel injector 20. The controller can also be configured to control flow rates of gaseous and liquid fuels to fuel injector 20. The selection of fuel type and flow rate can be made in an automated manner or can be performed by an operator of the gas turbine engine via, for example, a user interface.

The amount of fuel injected by fuel injector 20 is generally selected to provide an appropriate amount of fuel to form a stable air/fuel mixture in torch combustion chamber 22. Advantageously, torch igniters such as torch igniter 10 can be operated on low fuel flow rates during continuous operation. Limiting the fuel fed to combustion within torch igniter 10 can prevent a hot streak of combustion gases from entering combustor 26 and damaging combustor liner 14. In one such low flow rate configuration, fuel injector 20 injects fuel and air at a ratio of fuel to air in torch combustion chamber 22 is 10:1 at any point during operation. For example, a fuel injector may provide 1 lb. of fuel per hour during a pre-takeoff startup and may provide 40 lbs. per hour of fuel during takeoff or continuous operation. However, when air used for combustion in torch combustion chamber 22 is sufficiently hot, less fuel may be required for continuous operation of torch igniter 10. Under these conditions, torch igniter 10 may be operated with an air to fuel ratio of 30:1 (approximately 15 lbs. of fuel per hour), further reducing the amount of fuel consumed by torch igniter 10.

Generally, torch igniter 10 operates continuously during the entire operation time of the gas turbine engine in which it is located. Continuous operation allows torch igniter 10 to easily facilitate altitude re-lights of combustor 26 by acting as a pilot light for fuel ignition within combustor 26. Though torch igniter 10 generally operates continuously, torch igniter 10 may experience an unexpected blow-out at high altitudes. While torch igniter 10 is not operating, it is not able to relight combustor 26 in the event of a subsequent or simultaneous blow-out of combustor 26. Advantageously, combustion chamber 22 is sufficiently large that combustion can occur within combustion chamber 22 when air entering high-pressure case 16 from diffuser 30 is at a relatively low-pressure, such as at high altitudes while combustor 26 is not lit. Thus, even at high altitudes, torch igniter 10 can be re-lit and thereby re-light combustor 26 after blow-outs of torch igniter 10 and combustor 26.

Figure 2:
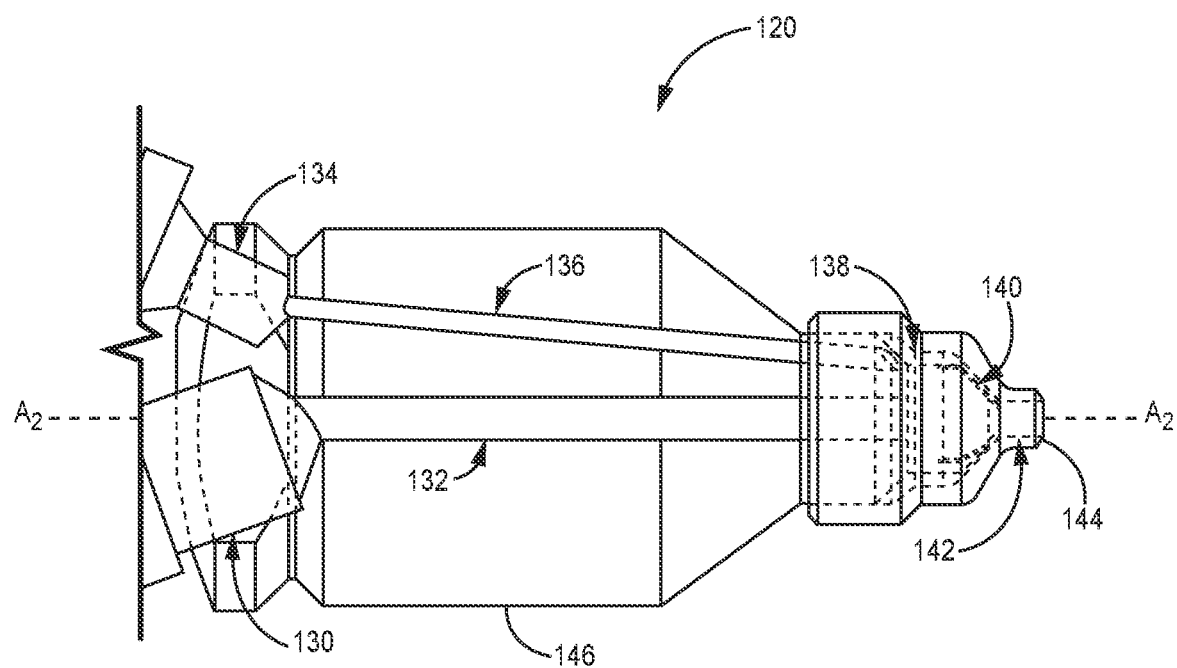
FIG. 2 is a transparent perspective view of one embodiment of a fuel injector for the torch igniter of FIG. 1.

FIG. 2 is a transparent perspective view of an example of a fuel injector that can be used with torch igniter 10 in place of fuel injector 20. Generally, fuel injector 120 is configured to use low fuel flow rates, as described previously with respect to fuel injector 20. Fuel injector 120 includes gas inlet 130, gas channel 132, liquid fuel inlet 134, liquid fuel channel 136, annular channel 138, metering channels 140, mixing annulus 142, injector aperture 144, and housing 146. Housing 146 has annular and frusto-conical portions and extends along axis $A_2$-$A_2$, and is shown partially transparent for illustration purposes. Generally, gas inlet 130 is disposed at an axial end of housing 146 and receive gaseous fuel from a gaseous fuel source or compressed air from an air source (e.g., an auxiliary air compressor or air from inside a high-pressure case, such as high-pressure case 16). Gaseous fuel flows from gas inlet 130 along gas channel 132 to injector aperture 144, which is configured to inject the gaseous fuel to impinge on, for example, surface igniter 21 in combustion chamber 22 of torch igniter 10, creating combustion gases that can be used to ignite fuel from fuel nozzle 18 in combustor 26. Gas channel 132 and injector aperture 144 extend along and are centered on axis $A_2$-$A_2$.

Fuel injector 120 is also capable of injecting an atomized liquid fuel into a torch igniter combustion chamber, such as combustion chamber 22. Liquid fuel is received from a liquid fuel source at liquid fuel inlet 134, which is also disposed at an axial end of housing 146. Liquid fuel flows from liquid fuel inlet 134 along liquid fuel channel 136 to annular channel 138. Liquid fuel channel 136 extends generally along axis $A_2$-$A_2$ adjacent to gas channel 132. Liquid fuel flows from annular channel 138 to mixing annulus 142 through metering channels 140, which configured to meter the flow of liquid fuel to mixing annulus 142 and are slot-shaped in the depicted embodiment. In mixing annulus 142, liquid fuel mixes with and is atomized by compressed air from gas channel 132. The resulting air/liquid fuel mixture is injected to a torch igniter combustion chamber, such as combustion chamber 22 of torch igniter 10, through injector aperture 144.

When used in torch igniter 10, fuel injector 120 can experience significant heat loads due to its position in the combustion section of a gas turbine engine. Air in the combustion section outside of torch igniter 10 can be more than 1000° F. Similarly, compressed air used to atomize liquid fuel is also usually at a relatively high temperature, further heating housing 146. Conversely, the degradation temperature of liquid fuels used in fuel injector 120 can be as low as 200° F. When the temperature of housing 146 exceeds the degradation temperature of the fuel, the fuel can degrade and form undesirable degradation products that can damage fuel injector 120 or other components of torch igniter 10. Liquid fuel flowing through liquid fuel channel 136 can provide some cooling to housing 146 due to its generally low temperature, but the overall cooling effect is minimal due to the low fuel flow rates of liquid fuel through liquid fuel channel 136.

Figure 3:
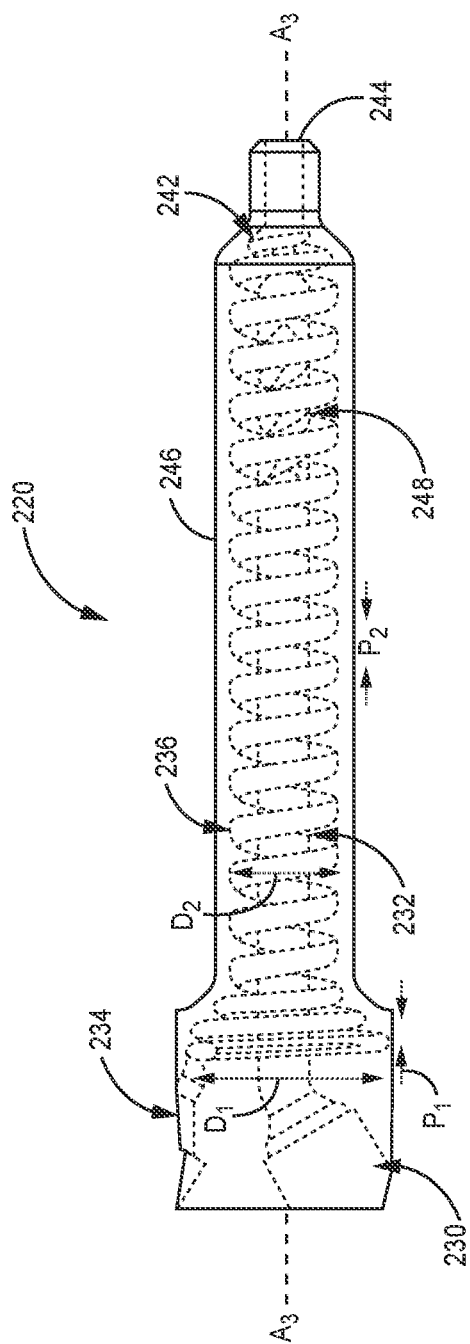
FIG. 3 is a transparent perspective view of an example of a fuel cooling system for the torch igniter of FIG. 1

FIG. 3 is a transparent perspective view of fuel injector 220, which has improved cooling characteristics over fuel injector 120. Fuel injector 220 can be used with torch igniter 10 in place of fuel injector 20, and includes gas inlet 230, gas channel 232, liquid fuel inlet 234, liquid fuel channel 236, mixing cavity 242, injector aperture 244, housing 246, and air swirler 248. Housing 246 is shown transparently to clearly illustrate the geometries of the components of fuel injector 220. Fuel injector 220 is capable of injecting gaseous fuels or an air/liquid fuel mixture, as described previously with respect to fuel injectors 20 and 120. Liquid fuel channel 236 extends helically about gas channel 232 and axis $A_3$-$A_3$, and has variable pitch and diameter as it extends. As compared to fuel injector 120, fuel injector 220 has improved cooling due to the increased length and available surface area of liquid fuel channel 236. This allows liquid fuel flowing through liquid fuel channel 236 to provide greater cooling to housing 246 than liquid fuel channel 136 of fuel injector 120 can provide to housing 146 at low flow rates, such as those used in torch igniter 10. Cooling housing 246 with liquid fuel flowing through liquid fuel channel 236 allows the liquid fuel to be regeneratively heated before it is used in combustion and allows for improved ignition of the liquid fuel. Advantageously, forming liquid fuel channel 136 as a single helical channel rather than multiple linear liquid flow channels (e.g., multiple channels similar to liquid fuel channel 36 arranged circumferentially around axis $A_3$-$A_3$) prevents flow separation of fuel and formation of stagnation zones and carbon deposits along fuel channel 136.

In the depicted example, the diameter of liquid fuel channel 236 decreases as it extends along axis $A_3$-$A_3$ from liquid fuel inlet 234 to injector aperture 244. Specifically, liquid fuel channel 236 has diameter $D_1$ where it is adjacent to liquid fuel inlet 234 and diameter $D_2$, which is lesser than diameter $D_1$, as it extends toward injector aperture 244. A greater diameter allows greater surface area for more cooling by liquid fuel flowing through liquid fuel channel 236, allowing liquid fuel channel 236 to provide greater cooling to specific portions of housing 246 likely to experience higher heat loads. Further, the helical diameter of liquid fuel channel 236 can also vary to mimic the overall shape of housing 246. As is shown in FIG. 3, liquid fuel channel 236 mimics the shape of housing 246, improving the cooling of the exterior surface of housing 246.

In the depicted example, the pitch of liquid fuel channel 236 increases as it extends from liquid fuel inlet 234 to injector aperture 244 along axis $A_3$-$A_3$. Specifically, liquid fuel channel 236 has a smaller pitch $P_1$ where it is adjacent to fuel inlet 234 and a larger pitch $P_2$ as it extends along axis $A_3$-$A_3$ toward injector aperture 244. The helical pitch of liquid fuel channel 236 affects the number of helical rotations that liquid fuel channel 236 makes, thereby affecting the total surface area available for housing 246 to transfer heat to liquid fuel flowing through liquid fuel channel 236. As such, the pitch can be decreased near areas of high heat transfer to housing 246 to increase the surface area of liquid fuel channel 236 available for cooling. Likewise, the pitch can be increased near areas where there is less heat transfer to housing 246. In the depicted example, the geometry of liquid fuel channel 236 causes liquid fuel to provide the greatest cooling to housing 246 adjacent to liquid fuel inlet 234.

In FIG. 3, gas channel 232 is depicted as centered on and extending linearly along axis $A_3$-$A_3$ and the helix of liquid fuel channel 236 is depicted as surrounding gas fuel channel 232. This configuration allows heat from compressed air flowing through gas fuel channel 232 to draw heat from compressed air flowing through gas channel 232.

Air flowing through gas channel 232 is imparted with a swirl relative to axis $A_3$-$A_3$ by air swirler 248 before it mixes with and atomizes liquid fuel flowing through liquid fuel channel 236 in mixing cavity 242, which has a generally frusto-conical shape. Imparting the air with a swirl can improve mixing and atomization of liquid fuel in mixing cavity 242. The resulting air/liquid fuel mixture is injected into a torch combustion chamber through injector aperture 244 to impinge on an ignition source, such as hot surface igniters 21 of torch igniter 10, and create hot combustion gases.

In the depicted example, liquid fuel channel 236 is directly connected to mixing cavity 242 and there is no metering channel structure that meters the flow of liquid fuel to mixing cavity 242. The depicted configuration reduces the complexity of fuel injector 220 and allows for adequately uniform atomization of fuel injected by fuel injector 220 where the pressure of gas flowing through gas channel 232 is sufficiently high. However, in alternative examples, fuel injector 220 can include metering channels connecting liquid fuel channel 236 to mixing cavity 242. These metering channels generally function similarly to metering channels 140 of fuel injector 120 and improve the uniformity of atomized fuel injected by fuel injector 220. Like metering channels 140, the metering channels in these examples can also have a slot-shaped structure in some embodiments.

Advantageously, fuel injector 220 can be formed monolithically by additive manufacturing. Forming fuel injector 220 via additive manufacturing allows for the complex and variable helical geometry of liquid fuel channel 236. Other techniques, such as brazing, are generally unable to form the geometry of liquid fuel channel 236. Likewise, any or all of fuel injector 220 can be formed from a metal material readily fabricable via additive manufacturing, such as Inconel or another nickel alloy, or a high-temperature stainless steel.

Further, while FIG. 3 depicts fuel injector 220 as having a single helical liquid fuel channel 236, fuel injector 220 could be equipped with two helical liquid fuel channels 236 arranged in a double-helix structure or three helical liquid fuel channels 236 arranged in a triple-helix structure. Each liquid fuel channel 236 could have its own liquid fuel inlet 234 or could be joined to a manifold connected to a single liquid fuel inlet 234. These examples are capable of increasing the surface area available to cool housing 246 by increasing the available number of helices. The length of each helical path can be decreased in some of these examples due to the additional cooling from the additional helical liquid fuel channels 236. Adding additional liquid fuel channels 236 can cause, for example, a lower pressure drop across liquid fuel channels 236 or an increased flow rate of fuel through liquid fuel channels 236. The number of liquid fuel channels 236 formed within fuel injector 220 can be optimized to balance cooling, pressure drop, and flow rate.

Figure 4:
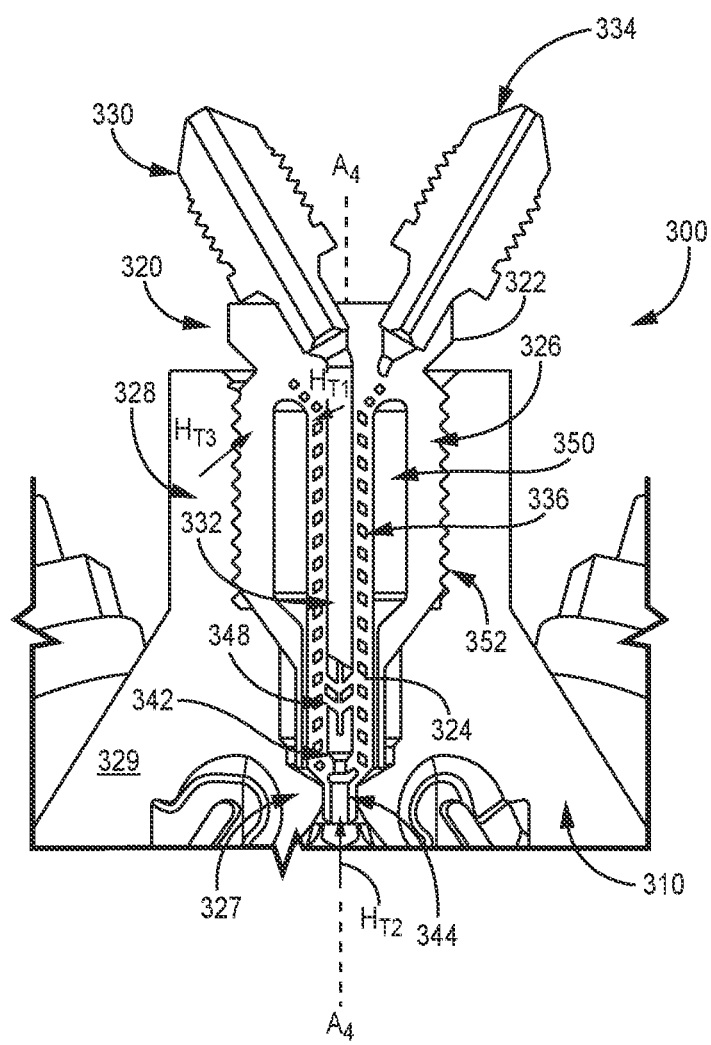
FIG. 4 is a cross-sectional view of a fuel injector for use in the torch igniter of FIG. 1

FIG. 4 is a cross-sectional view of fuel injector system 300 for use with torch igniter 310, which is formed similarly to torch igniter 10. Fuel injector system 300 includes injector body 320, which is received by torch igniter 310 and has axial wall 322, inner portion 324, and outer wall 326 sections. Axial wall 322, inner portion 324, and outer wall 326 extend along and are centered on axis $A_4$-$A_4$. Axial wall 322 is generally cylindrical, and inner portion 324 and outer wall 326 are generally annular and extend away from axial wall 322 along axis $A_4$-$A_4$, such that axial wall 322 forms an axial end of injector body 320. Receiving aperture 327 and receiving cavity 328 are formed in housing 329 of torch igniter 310. Inner portion 324 and outer wall 326 of injector body 320 are received by receiving aperture 327 and receiving cavity 328, respectively. Receiving aperture is formed in a cap of the combustion chamber of torch igniter 310 (shown more clearly in FIG. 5). Arrows $H_T$ indicate the direction of heat transfer to inner portion 324 of injector body 320.

Inner portion 324 is formed substantially the same as fuel injector 220, and includes gas inlet 330, gas channel 332, liquid fuel inlet 334, liquid fuel channel 336, mixing cavity 342, injector aperture 344, and air swirler 348. Liquid fuel channel 336 is helically shaped and surrounds gas channel 332, as described previously with respect to liquid fuel channel 236 and gas channel 232. Likewise, the helical pitch and diameter of liquid fuel channel 336 vary as described previously with respect to liquid fuel channel 236, such that liquid fuel channel 336 has the greatest helical diameter and the smallest helical pitch adjacent to gas inlet 330, liquid fuel inlet 334, and axial wall 322.

Liquid fuel flowing through liquid fuel channel 336 is able to draw heat from compressed air flowing through gas channel 332 (indicated by arrow $H_{T1}$), as described previously with respect to liquid fuel channel 336 and gas channel 232. Moreover, tip aperture 344 is in fluid communication with a combustion chamber of torch igniter 310 and is exposed to the heat of combustion. Heat from combustion gases in the torch combustion chamber can travel up inner portion 324 through the portion of inner portion 324 forming tip aperture 344 (indicated by arrow $H_{T2}$). Liquid fuel flowing through liquid fuel channel 336 can also absorb this heat to prevent overheating of inner portion 324 at tip aperture 344.

Outer wall 326 is attached to receiving cavity 328 by screw interface 352 and extends annularly around inner portion 324 from the axial end of screw interface 352 near axial wall 322 to the axial end of liquid fuel channel 336 adjacent to tip aperture 344. Receiving cavity 328 can be a significant source of heat transfer to injector body 320 and inner portion 324 due to its exposure to high-temperature air in the combustion section of a gas turbine engine. To protect inner portion 324 from heat flow from receiving cavity 328, outer wall 326 is spaced a distance from inner portion 324 and functions as a heat shield, forming stagnant air gap 350 between the inner surface of outer wall 326 and the outer surface of inner portion 324. Air gap 350 helps to thermally isolate inner portion 324 by insulating inner portion 324 from heat transfer from receiving cavity 328 of torch igniter 310. As such, heat from receiving cavity 328 primarily travels to inner portion 324 through the thin portion of injector body 320 connecting outer wall 326 and inner portion 324 to axial wall 322 (indicated by arrow $H_{T3}$). The helical diameter of liquid cooling channel 336 is greatest where it is adjacent to axial wall 322, allowing the greatest cooling of inner portion 324 where it is exposed to heat flowing according to arrow $H_{T3}$. Because outer wall 326 acts as a heat shield to protect inner portion 324, it can be at a higher temperature than inner portion 324 during operation of torch igniter 310 and fuel system 300.

As outlined above, the combination of the helical shape of liquid fuel channel 336 and air gap 350 formed by outer wall 326 is able to efficiently limit heat transfer to inner portion 324 and prevent excessive heating of inner portion 324, preventing degradation of inner portion 324 and liquid fuel flowing through liquid fuel channel 336. Specifically, this combination allows for liquid fuel to draw heat from compressed air and from the torch combustion chamber according to arrows $H_{T1}$ $H_{T2}$, respectively. Further, this combination reduces heat transfer to inner portion 324 from receiving cavity 328, according to arrow $H_{T3}$, by air gap 350.

Figure 5:
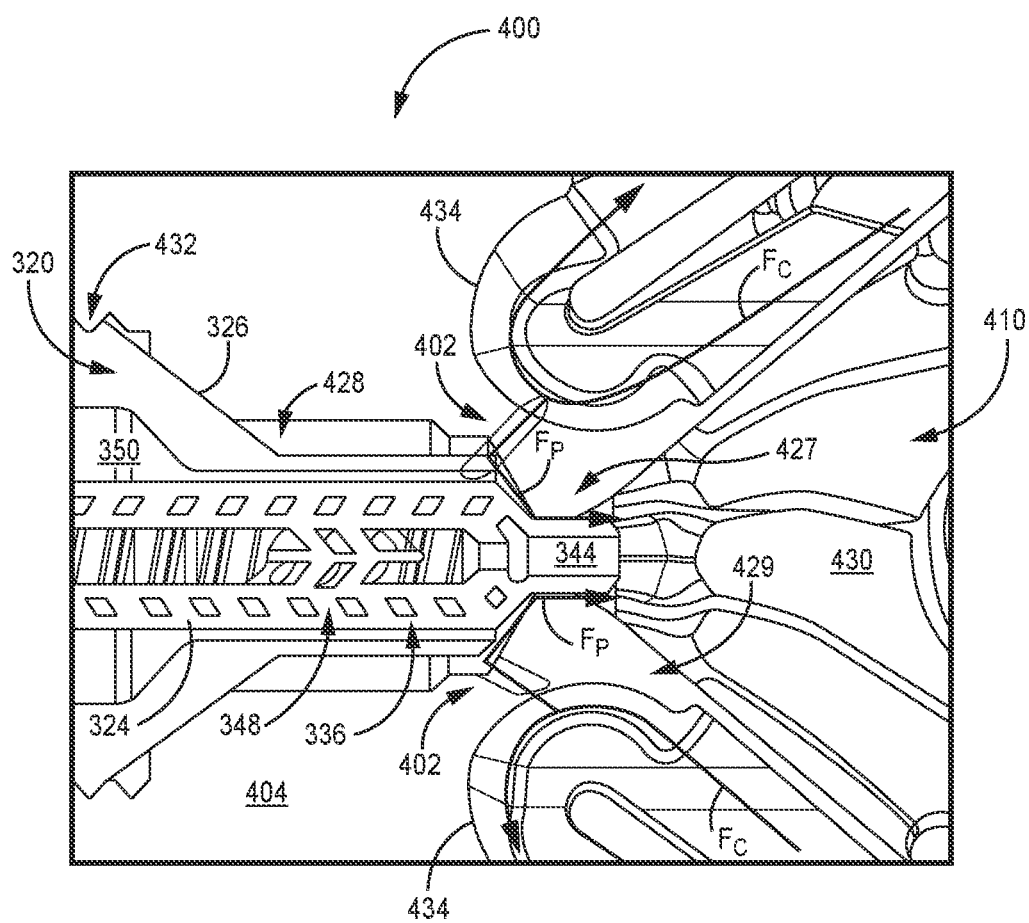
FIG. 5 is a cross-sectional view of the fuel injector of FIG. 4 showing air purge passages.

FIG. 5 is a cross-sectional view of fuel injector system 400, which is substantially similar to fuel injector system 300, but also includes purge passages 402 formed in housing 404 of torch igniter 410. Torch igniter 410 also includes receiving aperture 427 and receiving cavity 428 formed in housing 404, which function similarly to receiving aperture 327 and receiving cavity 328 of torch igniter 310. FIG. 5 shows that receiving aperture 427 is disposed in cap section 429 of housing 404, which forms an axially upstream end of torch combustion chamber 430, similar to cap section 25 of torch igniter 10. In torch igniter 410, the inner surface of housing 404 is spaced from the outer surface of outer wall 326 in receiving cavity 428 between receiving aperture 427 and screw interface 432, which attaches injector body 320 to housing 404. Purge passages 402 are fluidly connected to cooling channels 434, which extend through housing 404 and cool the inner surface of housing 404 where it surrounds combustion chamber 430. The flow of cooling air through cooling channels 434 is shown by flow path $F_c$ and the flow of purge air through purge passages 402 is shown by flow path $F_p$.

During operation of fuel injector system 400, fuel injected to combustion chamber 430 through injector aperture 344 can flow backwards through receiving aperture 427 and stagnate in receiving cavity 428 or air gap 350. The stagnated fuel resulting from this reverse flow can overheat and degrade, forming unwanted degradation products in air gap 350 and receiving cavity 428. Purge passages 402 are fluidly connected to cooling channels 434, which function similarly to cooling channels 28 of torch igniter 10, and are configured to divert a small portion (1%-5% of flow) of air flowing through cooling channels 434 to impinge on outer wall 326. The air stagnates against outer wall 326 in receiving cavity 428 and creates a positive pressure zone that prevents reverse flow of fuel through receiving aperture 427. Some of the stagnated purge air can continue to flow through receiving aperture 427 and into combustion chamber 430, as shown by flow path arrows $F_p$.

Though air flowing through cooling channels 434 is used to cool housing 404, it is generally at a sufficiently high temperature to overheat inner portion 324 and cause degradation of liquid fuel flowing through liquid fuel channel 336. Advantageously, purge passages 402 are configured to impinge air from cooling channels 434 onto outer wall 326 and stagnate against the outer surface of outer wall 326. As outer wall 326 is separated from inner portion 324 by insulating air gap 350, impinging air from cooling channel 434 against outer wall 326 prevents excessive heat transfer to inner portion 324.

Advantageously all components of any torch igniter disclosed herein can be formed partially or entirely by additive manufacturing. For metal components (e.g., Inconel, steel, other nickel alloys, etc.) exemplary additive manufacturing processes include but are not limited to powder bed fusion techniques such as direct metal laser sintering (DMLS), laser net shape manufacturing (LNSM), or electron beam manufacturing (EBM). Support-free additive manufacturing techniques, such as binder jetting, can also be used to form components of any torch igniter disclosed herein. Additive manufacturing is particularly useful in obtaining unique geometries (e.g., the helical structures of liquid fuel channels 236 and 336) and for reducing the need for welds or other attachments (e.g., axial wall 322, inner portion 324, and outer wall 326 of injector body 320). However, other suitable manufacturing processes can be used. For example, any or all of axial wall 322, inner portion 324, and outer wall 326 can be fabricated separately and joined via later manufacturing steps (e.g., brazing, welding or compression fitting) to form injector body 320.

The embodiments described herein advantageously allow for liquid fuel to be used to cool fuel injectors operating at low flow rates suitable for torch igniters, thereby reducing the degradation of liquid fuel flow through those fuel injectors. The embodiments described herein also advantageously reduce the amount of heat transferred to liquid fuel by thermally isolating liquid fuel-carrying components. Further, the embodiments described herein reduce the degradation of fuel in a fuel injector suitable for a torch igniter, both by cooling the injector body so that liquid fuel flowing through the injector body remains below its degradation temperature and by preventing reverse flow of fuel into insulative gaps in the injector body.

Discussion of Possible Embodiments

The following are non-exclusive descriptions of possible embodiments of the present invention.

An embodiment of a fuel injector system for a torch igniter includes an injector body centered on an axis, a receiving aperture formed in a cap of the torch igniter, an injector aperture, an air channel, a fuel channel, and a purge passage formed in a housing of the torch igniter and fluidly connected to a cooling air source. The injector body includes an axial wall at a first axial end of the injector body, an outer wall connected to the axial wall and extending along the axis transverse to the first wall, and an inner portion connected to the axial wall and extending along the axis transverse to the axial wall. An outer surface of the inner portion is spaced a distance from an inner surface of the outer wall, forming an insulating space between the outer wall and the inner portion. The receiving aperture receives the inner portion of the injector body at a second axial end of the injector body, wherein the second axial end is opposite the first axial end. The injector aperture is formed within the inner portion of the injector body and is directly fluidly connected to an interior volume of the torch igniter. The air inlet is configured to intake a flow of air at the axial wall and the fuel inlet is configured to intake a flow of fuel at the axial wall. The air channel is disposed within the inner portion, is configured to channel air from the air inlet to the injector aperture, and is centered on and extends along the axis. The fuel channel is disposed within the inner portion, is configured to channel fuel from the fuel inlet to the injector aperture, and is centered on the axis and extends helically about the air channel along the axis. The purge passage is configured to impinge cooling air from the cooling air source onto an exterior surface of the outer wall near the receiving aperture.

The fuel injector system of the preceding paragraph can optionally include, additionally and/or alternatively, any one or more of the following features, configurations and/or additional components:

A fuel injector system for a torch igniter according to an exemplary embodiment of this disclosure, among other possible things includes an injector body centered on an axis, a receiving aperture formed in a cap of the torch igniter, an injector aperture, an air channel, a fuel channel, and a purge passage formed in a housing of the torch igniter and fluidly connected to a cooling air source. The injector body includes an axial wall at a first axial end of the injector body, an outer wall connected to the axial wall and extending along the axis transverse to the first wall, and an inner portion connected to the axial wall and extending along the axis transverse to the axial wall. An outer surface of the inner portion is spaced a distance from an inner surface of the outer wall, forming an insulating space between the outer wall and the inner portion. The receiving aperture receives the inner portion of the injector body at a second axial end of the injector body, wherein the second axial end is opposite the first axial end. The injector aperture is formed within the inner portion of the injector body and is directly fluidly connected to an interior volume of the torch igniter. The air inlet is configured to intake a flow of air at the axial wall and the fuel inlet is configured to intake a flow of fuel at the axial wall. The air channel is disposed within the inner portion, is configured to channel air from the air inlet to the injector aperture, and is centered on and extends along the axis. The fuel channel is disposed within the inner portion, is configured to channel fuel from the fuel inlet to the injector aperture, and is centered on the axis and extends helically about the air channel along the axis. The purge passage is configured to impinge cooling air from the cooling air source onto an exterior surface of the outer wall near the receiving aperture.

A further embodiment of the foregoing fuel injector system, wherein the air channel extends linearly through the inner portion.

A further embodiment of any of the foregoing fuel injector systems, wherein the outer wall is annular, the inner portion is cylindrical, and the space between the outer wall and inner portion is annular.

A further embodiment of any of the foregoing fuel injector systems, wherein the air channel includes an air swirler that imparts a swirl to the air relative to the axis.

A further embodiment of any of the foregoing fuel injector systems, wherein the injector aperture is configured to impinge fuel from the fuel channel and air from the air channel onto a surface igniter at least partially disposed within the interior volume of the torch igniter.

A further embodiment of any of the foregoing fuel injector systems, further comprising a mixing cavity formed within the inner portion of the injector body.

A further embodiment of any of the foregoing fuel injector systems, wherein the mixing cavity connects the air channel and the fuel channel to the injector aperture.

A further embodiment of any of the foregoing fuel injector systems, wherein the fuel is liquid fuel and the mixing cavity is configured to atomize the liquid fuel with the air from the air channel.

A further embodiment of any of the foregoing fuel injector systems, wherein a helical diameter of the fuel channel decreases as the fuel channel extends from the fuel inlet to the injector aperture.

A further embodiment of any of the foregoing fuel injector systems, wherein a helical pitch of the fuel channel increases as the fuel channel extends from the fuel inlet to the injector aperture.

A further embodiment of any of the foregoing fuel injector systems, wherein the fuel injector system is formed monolithically.

A further embodiment of any of the foregoing fuel injector systems, wherein the injector body comprises a metallic material.

A further embodiment of any of the foregoing fuel injector systems, wherein the housing of the torch igniter forms a receiving cavity that receives the outer wall of the injector body.

A further embodiment of any of the foregoing fuel injector systems, wherein the outer wall of the injector body is spaced a second distance from an inner surface of the receiving cavity near the purge passage.

A further embodiment of any of the foregoing fuel injector systems, wherein the outer wall of the injector body and the inner surface of the receiving cavity form a channel configured to channel cooling air from the purge passage to the receiving aperture.

A further embodiment of any of the foregoing fuel injector systems, wherein a fluid pressure within the channel is higher than a fluid pressure adjacent to the receiving aperture within the interior volume of the torch igniter.

A further embodiment of any of the foregoing fuel injector systems, wherein fuel from the fuel source is at a lower temperature than an operating temperature of the injector body, and the fuel channel is configured to conduct heat from the injector body to fuel flowing through the fuel channel.

A further embodiment of any of the foregoing fuel injector systems, wherein cooling air from the cooling air source is at a higher temperature than an operating temperature of the inner portion of the injector body.

A further embodiment of any of the foregoing fuel injector systems, wherein a first operating temperature of the outer wall of the injector body is greater than a second operating temperature of the inner portion of the injector body.

An embodiment of a torch igniter for use in the combustor section of a gas turbine engine includes a combustion chamber oriented about an axis, a cap defining an axially upstream end of the combustion chamber and oriented about the axis, a tip defining an axially downstream end of the combustion chamber, a housing extending from the cap to the tip and defining a radial extent of the combustion chamber, an outlet passage defined by the housing within the tip, a glow plug capable of being resistively heated, a cooling channel formed in the housing, and the fuel injector system according to another embodiment of this invention. The combustion chamber has axially upstream and downstream ends defining a flow direction through the combustion chamber along the axis, the outlet passage is fluidly connected to the combustion chamber, an innermost end of the glow plug extends through the cap into the combustion chamber, and the cooling channel is configured to cool the housing. The fuel injector system is received in the cap.

The torch igniter of the preceding paragraph can optionally include, additionally and/or alternatively, any one or more of the following features, configurations and/or additional components:

A torch igniter for use in the combustor section of a gas turbine engine according to an exemplary embodiment of this disclosure, among other possible things includes a combustion chamber oriented about an axis, a cap defining an axially upstream end of the combustion chamber and oriented about the axis, a tip defining an axially downstream end of the combustion chamber, a housing extending from the cap to the tip and defining a radial extent of the combustion chamber, an outlet passage defined by the housing within the tip, a glow plug capable of being resistively heated, a cooling channel formed in the housing, and the fuel injector system according to another embodiment of this invention. The combustion chamber has axially upstream and downstream ends defining a flow direction through the combustion chamber along the axis, the outlet passage is fluidly connected to the combustion chamber, an innermost end of the glow plug extends through the cap into the combustion chamber, and the cooling channel is configured to cool the housing. The fuel injector system is received in the cap.

A further embodiment of the foregoing torch igniter, wherein the cap, the housing, and the tip together make up a single monolithic piece.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel injector system for a torch igniter, the fuel injector system comprising:
   an injector body centered on an axis, wherein the injector body includes an axial wall at a first axial end of the injector body;
   a receiving aperture formed in a cap of the torch igniter that receives an inner portion of the injector body at a second axial end of the injector body, the second axial end opposite the first axial end;
   an injector aperture formed within the inner portion of the injector body and directly fluidly connected to an interior volume of the torch igniter;
   an air inlet configured to intake a flow of air at the axial wall;
   a fuel inlet configured to intake a flow of fuel at the axial wall;
   an air channel disposed within the injector body and configured to channel the air from the air inlet to the injector aperture, wherein the air channel is centered on and extends along the axis;
   a fuel channel disposed within the injector body and configured to channel the fuel from the fuel inlet to the injector aperture;
   a receiving cavity formed in a housing of the torch igniter that receives the injector body, the receiving cavity directly fluidly connected to the receiving aperture;
   a purge passage formed in the housing of the torch igniter and fluidly connected to a cooling air source, wherein the purge passage is configured to impinge cooling air from the cooling air source into the receiving cavity and onto an exterior surface of the injector body near the receiving aperture; and
   wherein:

the exterior surface of the injector body is spaced a first distance from an inner surface of the receiving cavity near the purge passage; and the exterior surface of the injector body and the inner surface of the receiving cavity define a purge channel configured to channel the cooling air from the receiving cavity to the receiving aperture and through the receiving aperture into a combustion chamber of the torch igniter.

2. The fuel injector system of claim 1, wherein the injector body further includes an outer wall connected to the axial wall and extending along the axis transverse to the axial wall, and wherein:

the inner portion is connected to the axial wall and extends along the axis transverse to the axial wall; and an outer surface of the inner portion is spaced a second distance from an inner surface of the outer wall, forming an insulating space between the outer wall and the inner portion.

3. The fuel injector of claim 2, wherein the exterior surface of the injector body that the purge passage is configured to impinge the cooling air upon is located on the outer wall of the injector body.

4. The fuel injector of claim 2, wherein the air channel and fuel channel are disposed in the inner portion of the injector body.

5. The fuel injector system of claim 2, wherein the outer wall is annular, the inner portion is cylindrical, and the insulating space between the outer wall and inner portion is annular.

6. The fuel injector system of claim 2, wherein a first operating temperature of the outer wall of the injector body is greater than a second operating temperature of the inner portion of the injector body.

7. The fuel injector system of claim 2, wherein the cooling air from the cooling air source is at a higher temperature than an operating temperature of the inner portion of the injector body.

8. The fuel injector system of claim 1, wherein a fluid pressure within the channel is higher than a fluid pressure adjacent to the receiving aperture within the interior volume of the torch igniter.

9. The fuel injector system of claim 1, wherein the air channel includes an air swirler that imparts a swirl to the air relative to the axis.

10. The fuel injector system of claim 1, wherein the injector aperture is configured to impinge the fuel from the fuel channel and the air from the air channel onto a surface igniter at least partially disposed within the interior volume of the torch igniter.

11. The fuel injector system of claim 1, further comprising a mixing cavity formed within the injector body, wherein the mixing cavity connects the air channel and the fuel channel to the injector aperture.

12. The fuel injector system of claim 11, wherein the fuel is liquid fuel and the mixing cavity is configured to atomize the liquid fuel with the air from the air channel.

13. The fuel injector system of claim 1, wherein the fuel injector system is formed monolithically.

14. The fuel injector system of claim 1, wherein the injector body comprises a metallic material.

15. The torch igniter for use in the combustor section of a gas turbine engine, the torch igniter comprising:

the combustion chamber oriented about the axis, the combustion chamber having axially upstream and downstream ends defining a flow direction through the combustion chamber, along the axis, the cap defining the axially upstream end of the combustion chamber and oriented about the axis;

a tip defining the axially downstream end of the combustion chamber, the housing extending from the cap to the tip and defining a radial extent of the combustion chamber;

an outlet passage defined by the housing within the tip, wherein the outlet passage is fluidly connected to the combustion chamber;

a glow plug capable of being resistively heated, wherein an innermost end of the glow plug extends through the cap into the combustion chamber; and the fuel injector system according to claim 1, wherein the cooling air source is a cooling channel formed in and configured to cool the housing, and the fuel injector system is received in the cap.

16. The torch igniter of claim 15, wherein the cap, the housing, and the tip together make up a single monolithic piece.

* * * * *